United States Patent
Lange et al.

(10) Patent No.: US 8,267,433 B2
(45) Date of Patent: Sep. 18, 2012

(54) PLUG-IN COUPLING FOR CRYOGENIC LINES

(75) Inventors: Stephan Lange, Wedemark (DE); Christian Frohne, Hannover (DE); Michele Di Palma, Springe (DE); Klaus Schippl, Hannover (DE)

(73) Assignee: Nexans, Paris (FR)

( * ) Notice: Subject to any disclaimer, the term of this patent is extended or adjusted under 35 U.S.C. 154(b) by 37 days.

(21) Appl. No.: 12/085,713

(22) PCT Filed: Aug. 12, 2006

(86) PCT No.: PCT/EP2006/008007
§ 371 (c)(1),
(2), (4) Date: Jun. 15, 2009

(87) PCT Pub. No.: WO2007/065492
PCT Pub. Date: Jun. 14, 2007

(65) Prior Publication Data
US 2009/0261578 A1   Oct. 22, 2009

(30) Foreign Application Priority Data
Dec. 10, 2005 (DE) .......................... 10 2005 059 089

(51) Int. Cl.
*F16L 11/12* (2006.01)
(52) U.S. Cl. .......... 285/123.1; 285/47; 285/904; 62/50.7
(58) Field of Classification Search ................... 285/904, 285/123.1, 47; 62/50.7
See application file for complete search history.

(56) References Cited

U.S. PATENT DOCUMENTS

| | | | | |
|---|---|---|---|---|
| 2,785,536 A * | 3/1957 | Hinckley | ...... | 285/904 |
| 3,195,564 A * | 7/1965 | Carney et al. | ...... | 285/904 |
| 3,775,989 A * | 12/1973 | Mursinna et al. | ...... | 285/904 |
| 3,843,171 A * | 10/1974 | Hewlett | ...... | 285/904 |
| 3,884,511 A * | 5/1975 | Hermanson | ...... | 285/904 |
| 3,988,029 A * | 10/1976 | Gibson | ...... | 285/904 |
| 4,011,732 A * | 3/1977 | Doherty et al. | ...... | 285/904 |
| 4,491,347 A * | 1/1985 | Gustafson | ...... | 285/904 |
| 6,134,893 A * | 10/2000 | Bonn | ...... | 285/904 |
| 6,695,358 B2 * | 2/2004 | Bonn | ...... | 285/904 |
| 7,052,047 B1 * | 5/2006 | Box et al. | ...... | 285/904 |
| 7,137,651 B2 * | 11/2006 | Bonn | ...... | 285/904 |
| 2002/0089177 A1 | 7/2002 | Bonn | ...... | 285/123.5 |

OTHER PUBLICATIONS

International Search Report dated Dec. 13, 2006.

* cited by examiner

*Primary Examiner* — David E Bochna
(74) *Attorney, Agent, or Firm* — Sofer & Haroun, LLP

(57) ABSTRACT

A plug-in coupling for cryogenic lines is described, having at least two pipes (3, 4, 9, 10) fitted one inside the other like a male/female connection while forming an annular gap (16), in which plug-in coupling the pipes (3, 4, 9, 10) are releasably connected to one another by a flange connection (5, 11) located at their "warm" end, the annular gap (16) between the two pipes (4, 9) is sealed at the "cold" end by an annular seal (7) and at the "warm" end by an annular seal (5*d*) located in the region of the flange connection (5, 11), and the annular gap (16) is connected to a safety valve (13) in the region of the flange connection (5, 11).

4 Claims, 2 Drawing Sheets

PLUG-IN COUPLING FOR CRYOGENIC LINES

RELATED APPLICATIONS

This application is a National Phase application of PCT/EP2006/008007, filed on Aug. 12, 2006, which in turn claims the benefit of priority from German Patent Application No. 10 2005 059 089.6, filed on Dec. 10, 2005, the entirety of which is incorporated herein by reference

FIELD OF THE INVENTION

The invention relates to a plug-in coupling for cryogenic lines.

BACKGROUND

Such couplings, which are also designated as Johnston couplings, are generally used in vacuum-insulated piping systems which are used for transporting cryogenic media. Due to the elements of the coupling, which are expediently of double-walled and vacuum-insulated design, greater spatial distance between the connecting point of the two outer coupling elements and the point at which the cryogenic medium passes over from the one line into the other line is provided. This is intended to reduce icing of the coupling point and losses of the cryogenic medium due to vaporization. In such a coupling, the coupling plug is also designated as "male part" and the associated coupling socket as "female part".

A plug-in coupling for the inner pipes of a vacuum-insulated pipeline is known from DE-A-3142702, in which plug-in coupling the inner pipes are fitted together like a male/female connection. In the case of this connection, liquid can escape at the front-end connection of the pipes and can enter the annular gap between the pipes of the plug-in connection and vaporize there. Since this annular gap is sealed at its other end, a pressure cushion which prevents further escape of liquid from the inner pipe builds up. However, this pressure cushion can only build up in the case of an arrangement inclined at least relative to the horizontal, in particular a vertical arrangement, and then only if the male part is inserted into the female part from above.

A plug-in connection for line pipes like a male/female connection for transporting low-temperature media is known from DE-U-84 32 062, in which plug-in connection the inner plug part (male part) is made of a metal having a low coefficient of expansion and the outer plug part (female part) is made of a metal having a normal coefficient of expansion. The inner plug part is made of a steel containing more than 30% nickel, whereas the outer plug part is made of brass, copper or high-grade steel. In this arrangement, the outer coupling part of the coupling parts fitted one inside the other therefore shrinks onto the inner coupling part when the cryogenic medium flows through the line pipe. In this way, the annular gap required for fitting the coupling parts one inside the other is sealed and escape of liquid or vapor is restricted to the greatest possible extent. However, a precondition for this is that those surfaces of the coupling parts which face one another have extremely low roughness. Nonetheless, 100% sealing of the annular gap cannot be achieved, such that there is still the risk of icing in the "warm" region of the plug-in coupling and therefore a loss of cryogenic liquid occurs.

DE 41 07 652 A1 describes a device for coupling pipelines for cryogenic media, in which device the ends of two vacuum-insulated pipelines to be connected are provided with end pieces which make possible a coupling like a male/female connection. In this coupling, the annular gap between the male part and the female part is closed at both ends by a seal.

A plug-in connection for vacuum-insulated line pipes which consist of an inner pipe and an outer pipe and are intended for transporting liquefied gases is known from US 2002/0089177 A1, the end regions of which plug-in connection can be fitted one inside the other like a male/female connection. Each line pipe has a safety valve which is welded in place in the outer pipe and opens in the event of an excess pressure in the annular space between the inner pipe and the outer pipe. The annular gap between the male part and the female part is not sealed at the end.

OBJECTS AND SUMMARY

The object of the present invention is to provide a releasable plug-in coupling for cryogenic lines which is distinguished by extremely small losses. In particular, the generation of an excess pressure in the annular gap during rapid heating of the plug-in coupling is to be prevented.

Due to the arrangement of a seal in the "cold" region of the plug-in coupling, the ingress of cryogenic liquid into the annular gap between the coupling parts as far as the flange and the consequent icing with a high input of heat can be restricted to the greatest possible extent, if not prevented. The sealing in the cold region is achieved and maintained by a force which acts in the longitudinal axial direction being introduced into the sealing body. This force is produced via the flange connection. The seal can be made of Teflon or else of a metal. In the flange region, further sealing is produced via an O ring seal. This annular seal located in the "warm" region of the plug-in coupling is arranged between the flange extensions and makes possible a longitudinal displacement of the flanges while maintaining the sealing effect. Despite these seals, air or also cryogenic liquid or vapor can possibly penetrate into the annular gap and condense there. When the coupling warms up, an excess pressure may then occur in the annular gap, and this excess pressure could lead to destruction of the coupling. The fitted safety valve prevents an excess pressure in the annular gap and thus destruction of the coupling. However, this safety valve is only required for the extreme case.

BRIEF DESCRIPTION OF THE DRAWINGS

The invention is described in more detail with reference to the exemplary embodiments shown schematically in FIGS. 1 and 2.

DETAILED DESCRIPTION

Figure 1:
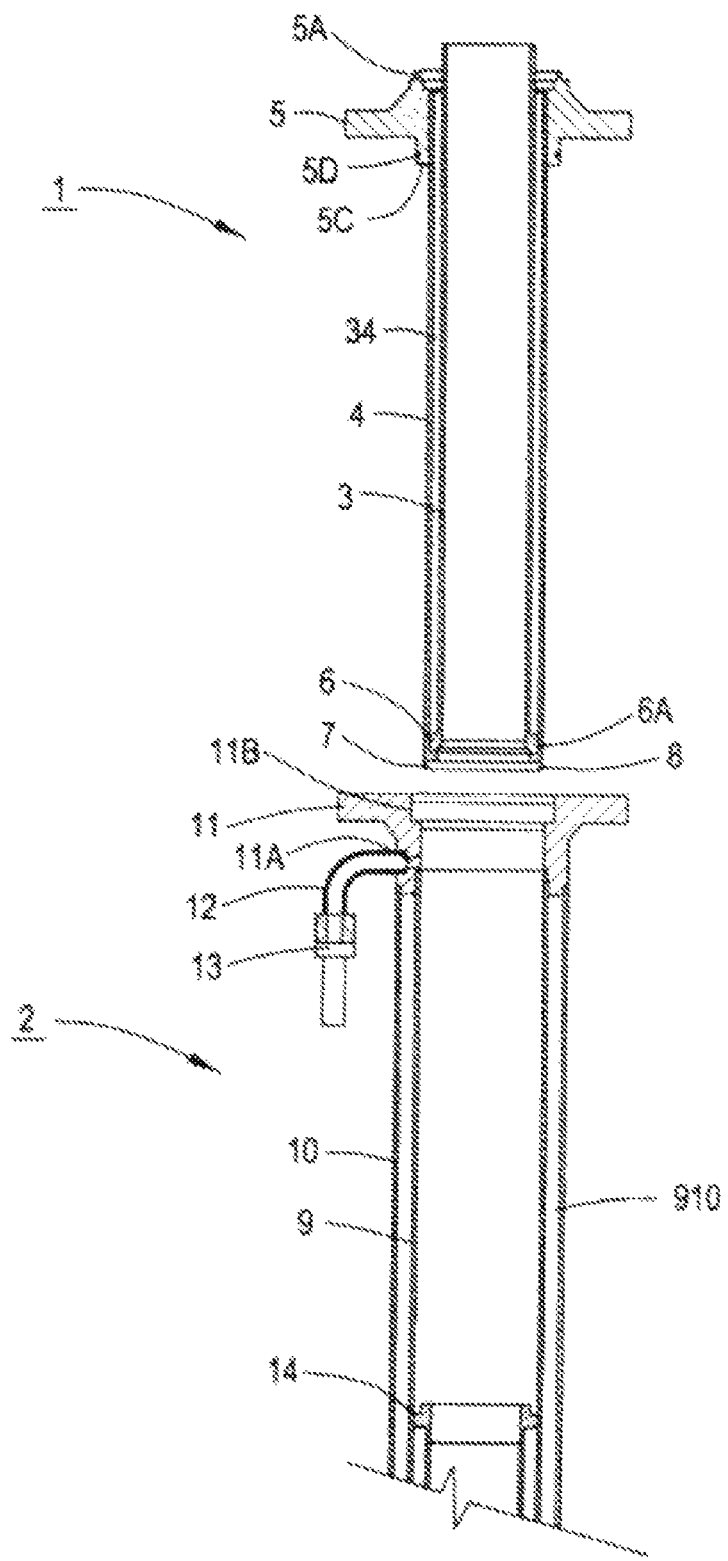

The two coupling elements 1 and 2 are shown before assembly in FIG. 1. Designation 1 indicates the coupling plug, the male part, whereas designation 2 indicates the coupling socket, the female part.

The coupling plug 1 consists of an inner pipe length 3 and an outer pipe length 4 which enclose an evacuated annular space 34 between them, said evacuated annular space 34 being connected to the evacuated annular space of the cryogenic line (not shown). A flange 5 is welded vacuum-tight to one end of the outer pipe length 4. Those ends of the inner pipe length 3 and of the outer pipe length 4 which are remote from the flange 5 are each welded vacuum-tight to a locating part 6. The locating part 6 has a tubular projection 6a in which a sealing ring 7 is arranged, which is secured in the projection 6a by a snap ring 8.

That end of the inner pipe length 3 which is located in the region of the flange 5 is welded vacuum-tight to the inner pipe of the cryogenic line in a manner not shown in any more detail, whereas the outer pipe of the cryogenic line is welded vacuum-tight to the flange 5, likewise in a manner not shown in any more detail. For this purpose, the flange 5 has a welding lip 5a.

The coupling socket 2 likewise consists of an inner pipe length 9 and an outer pipe length 10 which are welded vacuum-tight to a flange 11 at one end. The inside diameters of the bore of the flange 11 and of the inner pipe length 9 are slightly larger than the outside diameter of the outer pipe length 4 of the coupling plug 1. In a manner not shown, those ends of the pipe lengths 9 and 10 which are remote from the flange 11 are welded vacuum-tight to the inner pipe and the outer pipe, respectively, of the cryogenic line or to a feed connection piece of a cooling plant for the cryogenic medium. The annular space 910 located between the inner pipe length 9 and the outer pipe length 10 is connected to the evacuated space of the cryogenic line or is partitioned off at the end.

The flange 5 has a tubular extension 5b which is opposite the welding lip 5a and on whose outer lateral surface an annular groove 5c with a sealing ring 5d located therein is provided. Located in the flange 11 is a bore 11a, in which a pipe length 12 is welded in place in a vacuum-tight manner, a safety valve 13 being located on the end of said pipe length 12. In its inner bore, the flange 11 has a widened diametral portion 11b, into which the tubular extension 5b of the flange 5 can be inserted. The coupling socket 2 also has a stop 14 which is welded onto the end of the inner pipe length 9 facing away from the flange 11 and which serves as a counter bearing for the sealing ring 7.

Figure 2:
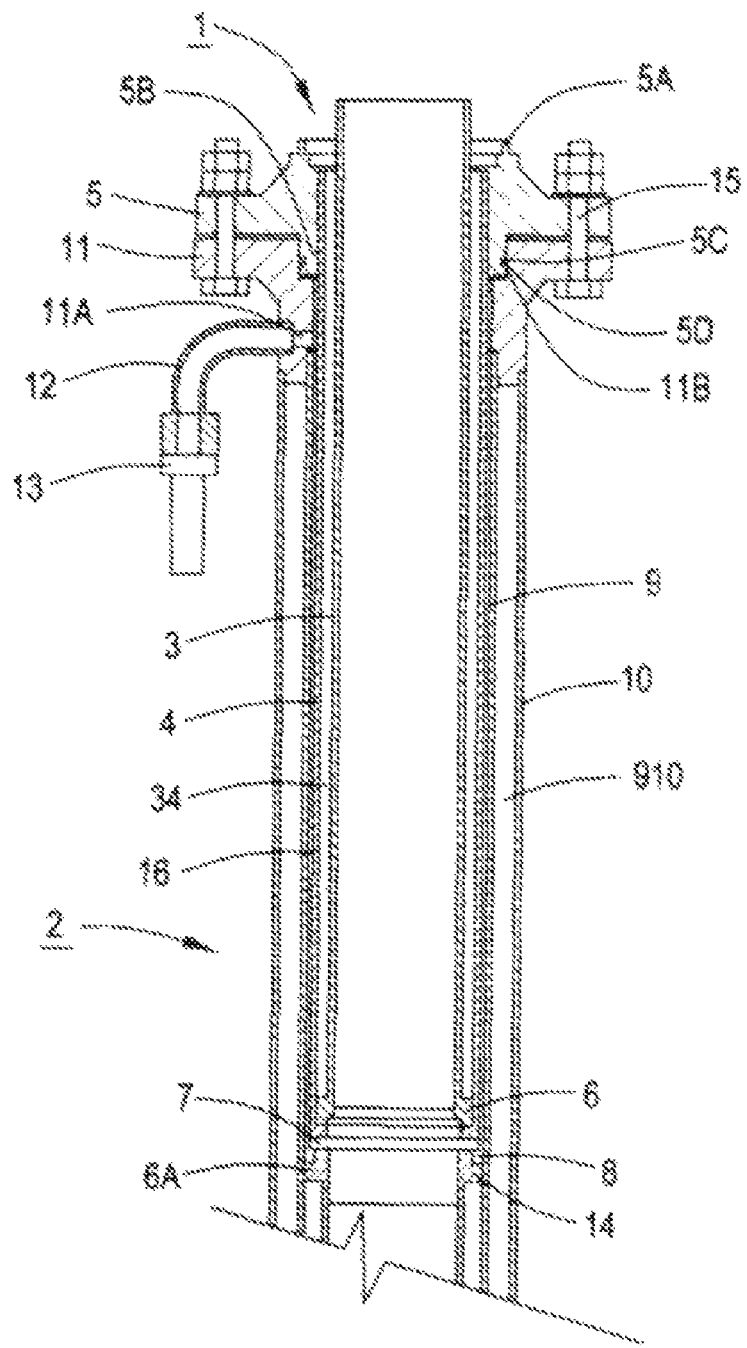

FIG. 2 shows the plug-in coupling in the assembled state. The two flanges 5 and 11 are connected using screw bolts 15. The screw bolts 15 are set in such a way that a force acting in the longitudinal axial direction constantly prestresses the sealing ring 7 and thus seals the annular gap 16 located between the coupling plug 1 and the coupling socket 2 relative to the interior space of the cryogenic line. At the opposite end, the annular gap 16 is sealed by the sealing ring 5d. For the extreme case where air or cryogenic medium has nonetheless penetrated into the annular gap 16, and an excess pressure is produced in the annular gap 16, the safety valve 13 opens and prevents destruction of the plug-in coupling due to excessive pressure.

The invention can be used for connecting line pipes for transporting cryogenic media. An especially preferred field of use is the connection between a superconductor cable system and a termination.

The invention claimed is:

1. A plug-in coupling for cryogenic lines comprising:
   at least two parts, a first male part and a second female part fitted one inside the other like a male/female connection while forming an annular gap, wherein within said plug-in coupling, the parts are releasably connected to one another by a flange connection located at their warm end, the annular gap between an outer pipe of said male part and an inner pipe of said female part is sealed at the cold end by an annular seal and at the warm end by an annular seal located in the region of the flange connection, and the annular gap is connected to a safety valve in the region of the flange connection, said safety valve configured to release excess pressure from air and cryogenic medium trapped in said annular gap proximate said flange connection at said warm end of said first and second parts.

2. The plug-in coupling as claimed in claim 1, wherein the end of the female pipe is widened in its inside diameter, in that the male pipe penetrates into this widened region, and in that the seal provided at the cold end is clamped in place between a transition region from the smaller to the larger inside diameter and the end of the male pipe by a force acting in the longitudinal axial direction.

3. The plug-in coupling as claimed in claim 1, wherein the safety valve is connected to the annular gap via a pipe length let into the flange of the female pipe in a gastight manner.

4. The plug-in coupling as claimed in claim 1, wherein the two flanges of the flange connections are elastically prestressed.

* * * * *